Patented Jan. 4, 1938

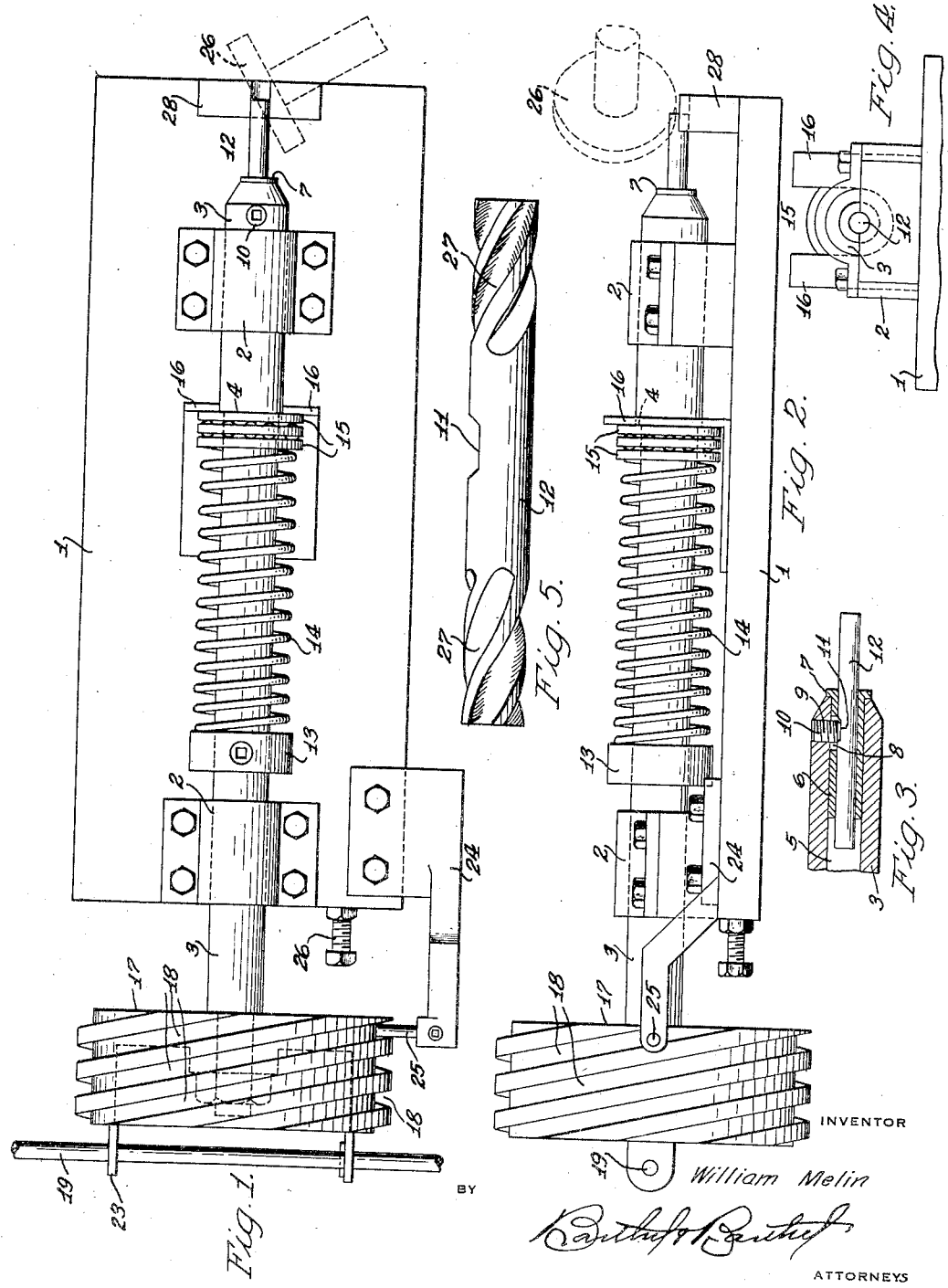

2,104,267

UNITED STATES PATENT OFFICE 2,104,267

FIXTURE FOR MILLING MACHINES

William Melin, Detroit, Mich.

Application June 13, 1936, Serial No. 85,163

4 Claims. (Cl. 90—13.9)

The present invention relates to work supporting fixtures for milling and grinding machines. The primary object of the present invention is to provide a fixture for circular milling machines or grinding machines embodying a movable work support and means for moving the same in such manner that the work carried by the support is advanced into engagement with the milling cutter so that the cutter forms a plurality of definitely spaced spiral grooves or flutes in the work. More particularly, the work support comprises a spindle mounted for both rotary and lengthwise movement with respect to its base and mounted thereon is a body formed with a plurality of spiral grooves which cooperate with a stationary element on the base in such manner that when manual pressure is applied to the grooved body with a groove wall in engagement with the stationary element it causes the work to advance into the path of the cutter or grinding tool at the same time it is rotated. The grooved body thus automatically indexes the grooves formed in the work both as to movement into engagement with the cutter or grinding tool and retractive movement away from the cutter or grinding tool.

Another object of the present invention is to provide in a fixture of the character referred to means for automatically withdrawing the work from the cutter or grinding tool and for guiding movement of the work during such withdrawal so that the cutter or grinding wheel does not damage the walls of the grooves or flutes formed in the work by contacting therewith during such withdrawal.

With the above and other ends in view the invention is more fully disclosed with reference to the accompanying drawing, in which Figure 1 is a plan view;
Fig. 2 is a side elevation;
Fig. 3 is a section of a detail;
Fig. 4 is an end element, and
Fig. 5 is an elevation of a work piece.

Like characters of reference are employed throughout to designate corresponding parts.

The numeral 1 designates a base adapted for attachment to a milling machine or to a grinding machine. Upon the base 1 are provided bearings 2 which support a spindle 3 for both rotative and reciprocal movement. The spindle 3 has a shoulder 4 formed at a point therein located between the bearings 2 and with a bore 5 entering the outer end thereof and extending axially with respect thereto. Received in the bore 5 is a sleeve 6 having an end flange 7 adapted to engage the end of the spindle 3 so as to restrict its inward movement with respect to the bore 5 and with a slot 8 in the side wall thereof. Received in a radially extending screwthreaded bore 9 in the spindle 3 is a set screw 10 which extends through the slot 8 in the sleeve 6 to engage the flat portion 11 on a piece of work 12. The work 12 is thus supported projecting axially from the end of the spindle 3. In the case of work pieces, such as that shown at 12, having different diameters the work support described above accommodates such different diameters by employing sleeves, such as shown at 6, having the required internal diameter to fit the different work pieces, in which case all of the sleeves have the same outer diameter so that they fit the bore 5.

Fixed to the spindle 3 is a collar 13 and a coiled spring 14 is compressed between the collar 13 and an anti-friction bearing construction 15. The thrust bearing construction 15 normally bears against a shoulder 4 and a forked yoke 16 is secured to the base 1 for engagement with the bearing construction 15 upon the movement of the spindle lengthwise in a manner to be hereinafter described.

Secured to the end of the spindle 3 is a body 17 having a plurality of spiral grooves 18 formed in the periphery thereof. A rod 19 is attached to the body 17 by means of brackets 23 and provides means whereby manual pressure may be exerted against the body 17 to rotate the same. Secured to the base 1 is a bracket 24 carrying a pin 25 which is adapted to project into the grooves 18. Mounted on the end of the base 1 is an adjustable stop 26 adapted to be engaged by the body 17.

In operation of the present fixture the body 17 is moved manually through application of pressure upon the rod or lever 19 so that one of the grooves 18 is alined with the pin 25 substantially as shown in Figs. 1 and 2. Such movement is possible because prior to movement of the head 17 so that the pin 25 projects into one of the grooves 18 the spring 14 is confined between the collar 13 and the shoulder 4 on the spindle and has no tendency to move the spindle in either direction. After the body 17 and pin 25 have been alined rotative pressure is applied to the head and rotation thereof with the pin 25 engaging the side wall of the groove 18 causes the spindle 3 to move lengthwise and to carry the work 12 into engagement with the tool indicated at 26 in dotted lines. The particular type of work shown by way of example comprises an end mill and the purpose of the fixture is to provide spiral grooves 27 therein such as shown in Fig. 5. Due to the fact that the mechanism above described causes the spindle 3 to rotate as it advances the work 12 is engaged by the cutter 26 in such manner that the spiral grooves or flutes 27 are formed.

As the spindle 3 moves the work into engagement with the cutter the spring 14 is compressed between the collar 13 and the forked yoke 16 and after the spindle has been moved sufficiently that the body 17 engages the limiting stop 26 the manual pressure is relieved therefrom and the spring 14 moves the spindle back to its original position. The body 17 is then moved so that the next of the plurality of grooves 18 engages the pin 25 and the same operation is repeated and therefore by providing the desired number of grooves on the body 18 the desired number of flutes or grooves will be formed in the work.

The tool 26 has been described as comprising a circular milling tool but it is to be understood that the fixture is not confined to use with milling machines alone for after the flutes have been cut into the work as above described their surfaces are ground. For the grinding operation a grinding wheel having the same or substantially the same diameter as the milling cutter 26 is substituted therefor, or a similar fixture could be employed with a separate grinding machine. In any event the relative movement between the work and tool would be the same with a grinding wheel as it was with the milling tool.

In the formation of the grooves as above described the work, in projecting from the end of the spindle, has a tendency to flex under the pressure of the cutter or grinding wheel. If such flexing were permitted to take place the accuracy of the groove formations would suffer accordingly and to eliminate any possibility of such flexing the present fixture provides a bearing block 28 having a groove therein receiving and supporting the work by engagement with the surface thereof directly opposite to the portion engaged by the tool.

Although a specific embodiment of the invention has been illustrated and described it will be understood that various changes may be made in the details of construction without departing from the scope of the appended claims and such changes are contemplated.

What I claim is:—

1. A milling machine fixture comprising a base plate, bearings on said base plate, a spindle supported in said bearings for rotary and lengthwise movement, means for causing lengthwise movement of said spindle, means for causing rotary movement of said spindle incident to lengthwise movement thereof, means on one end of said spindle for supporting work, a pair of spring abutments on said spindle, one of said abutments being fixed and the other being movable lengthwise of the spindle, a spring between said abutments, and stationary means on said base adapted to be engaged by the movable abutment upon lengthwise movement of said spindle to cause compression of said spring.

2. A milling machine fixture comprising a base plate, bearings on said base plate, a spindle supported in said bearings for rotary and lengthwise movement, means for causing lengthwise movement of said spindle, means for causing rotary movement of said spindle incident to lengthwise movement thereof, means on one end of said spindle for supporting work, a pair of spring abutments on said spindle, one of said abutments being fixed and the other being movable lengthwise of the spindle, means on said spindle for positively limiting movement of the movable abutment with respect to said spindle, a spring between said abutments, and stationary means on said base adapted to be engaged by the movable abutment upon lengthwise movement of said spindle to cause compression of said spring.

3. A milling machine fixture comprising a base plate, bearings on said base plate, a spindle supported in said bearings for rotary and lengthwise movement, means for causing lengthwise movement of said spindle, means for causing rotary movement of said spindle incident to lengthwise movement thereof, means on one end of said spindle for supporting work, a pair of spring abutments on said spindle, one of said abutments being fixed and the other being movable lengthwise of the spindle, a spring between said abutments, stationary means on said base adapted to be engaged by the movable abutment upon lengthwise movement of said spindle to cause compression of said spring, and anti-friction means between said movable abutment and said stationary means.

4. A milling machine fixture comprising a base plate, bearings on said base plate, a spindle supported in said bearings for rotary and lengthwise movement, means for causing lengthwise movement of said spindle, means for causing rotary movement of said spindle incident to lengthwise movement thereof, means on one end of said spindle for supporting work, a pair of spring abutments on said spindle, one of said abutments being fixed and the other being movable lengthwise of the spindle, said fixed abutment having releasable means for holding the same fixed with respect to said spindle whereby it may be moved to various positions of adjustment, a spring between said abutments, and stationary means on said base adapted to be engaged by the movable abutment upon lengthwise movement of said spindle to cause compression of said spring.

WILLIAM MELIN.